United States Patent [19]

Kamimura et al.

[11] Patent Number: 5,014,204

[45] Date of Patent: May 7, 1991

[54] SYSTEM FOR DETECTING POSITION OF MOVING VEHICLE AND SYSTEM FOR DETECTING REFERENCE POINTS THEREFOR

[76] Inventors: Kenji Kamimura; Sadachika Tsuzuki, both of c/o Kabushikigaisha Honda Gijutsu Kenkyusho 4-1, Chuo 1-chome, Wako-shi, Saitama-ken, Japan

[21] Appl. No.: 454,821

[22] Filed: Dec. 22, 1989

[30] Foreign Application Priority Data

Jan. 7, 1989 [JP] Japan .................................... 1-1867

[51] Int. Cl.⁵ ............................................ G06F 15/50
[52] U.S. Cl. ............................. 364/449; 364/424.02; 356/375; 318/587; 180/167; 180/169
[58] Field of Search ................ 364/443, 449, 424.02; 250/560, 561; 180/167–169; 358/103; 318/587; 356/1, 152, 375

[56] References Cited

U.S. PATENT DOCUMENTS

| | | | |
|---|---|---|---|
| 4,225,226 | 9/1980 | Davidson et al. | 364/449 |
| 4,309,758 | 1/1982 | Halsall et al. | 364/424.02 |
| 4,626,995 | 12/1986 | Lofgren et al. | 364/449 |
| 4,700,301 | 10/1987 | Dyke | 356/1 |
| 4,796,198 | 1/1989 | Boultinghouse et al. | 250/561 |
| 4,818,107 | 4/1989 | Ono et al. | 356/375 |
| 4,882,689 | 11/1989 | Aoki | 364/449 |
| 4,936,678 | 6/1990 | Gordon et al. | 356/375 |
| 4,964,722 | 10/1990 | Schumacher | 356/152 |

*Primary Examiner*—Gary Chin
*Attorney, Agent, or Firm*—Pollock, VandeSande and Priddy

[57] ABSTRACT

A system for detecting reference points to calculate a position of a moving vehicle comprising a means for detecting the azimuth of each light-reflecting means in respect of the moving vehicle on the basis of the reflected light from the light-reflecting means, a means for calculating the current position of the moving vehicle on the basis of the azimuths, a means for calculating the available existence area in which the moving vehicle is predicted to exist at the next azimuth detection time, a means for comparing the position of the moving vehicle calculated on the basis of the detected azimuth at the next azimuth detection time with the available existence area, and a judging means for judging that the detected azimuth is that of the light-reflecting means disposed at the expected reference point if the calculated moving vehicle position is in the available existence area, while the detected azimuth is not that of the light-reflecting means disposed at the expected reference point if the calculated moving vehicle position is not in the available existence area.

12 Claims, 13 Drawing Sheets

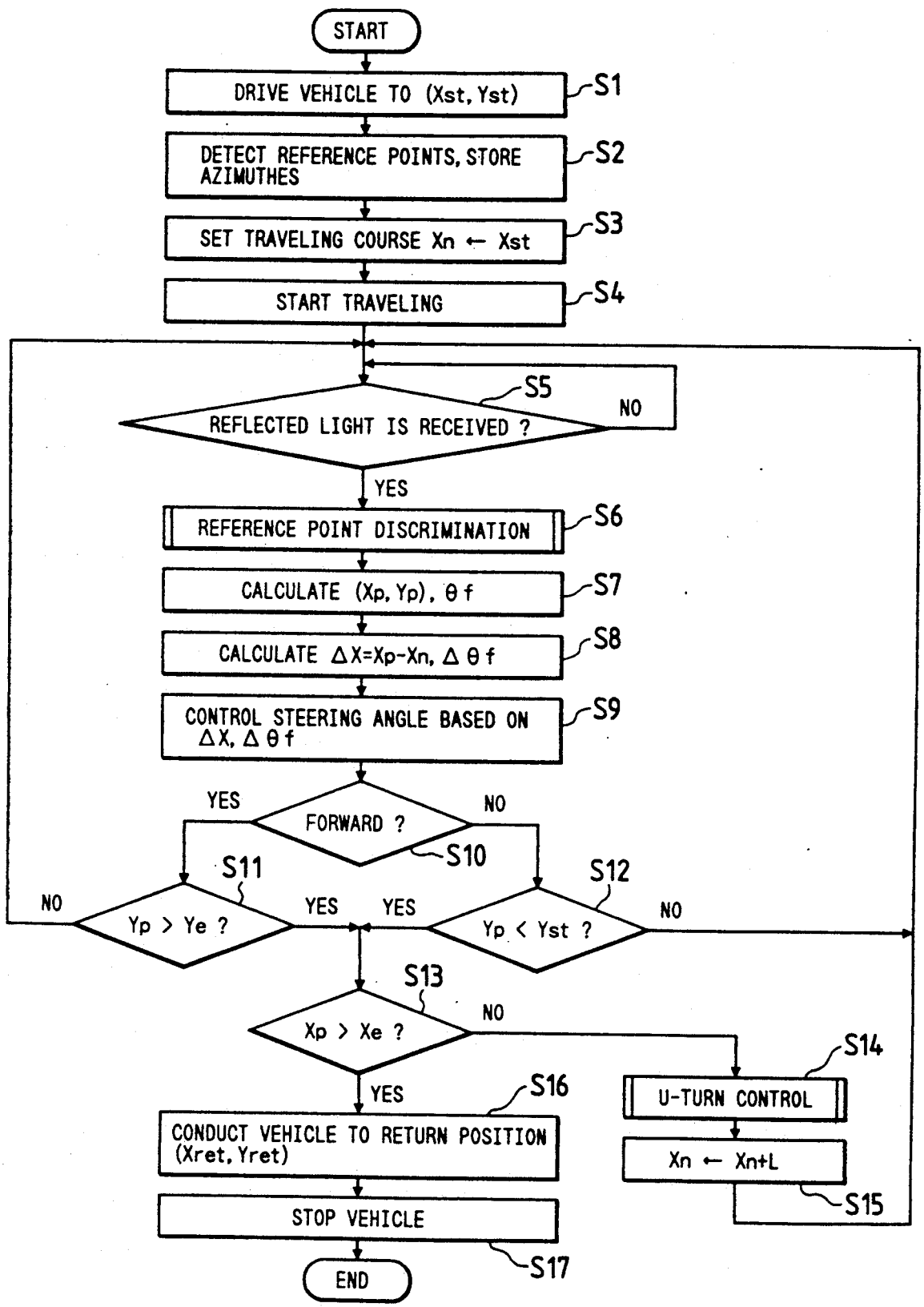

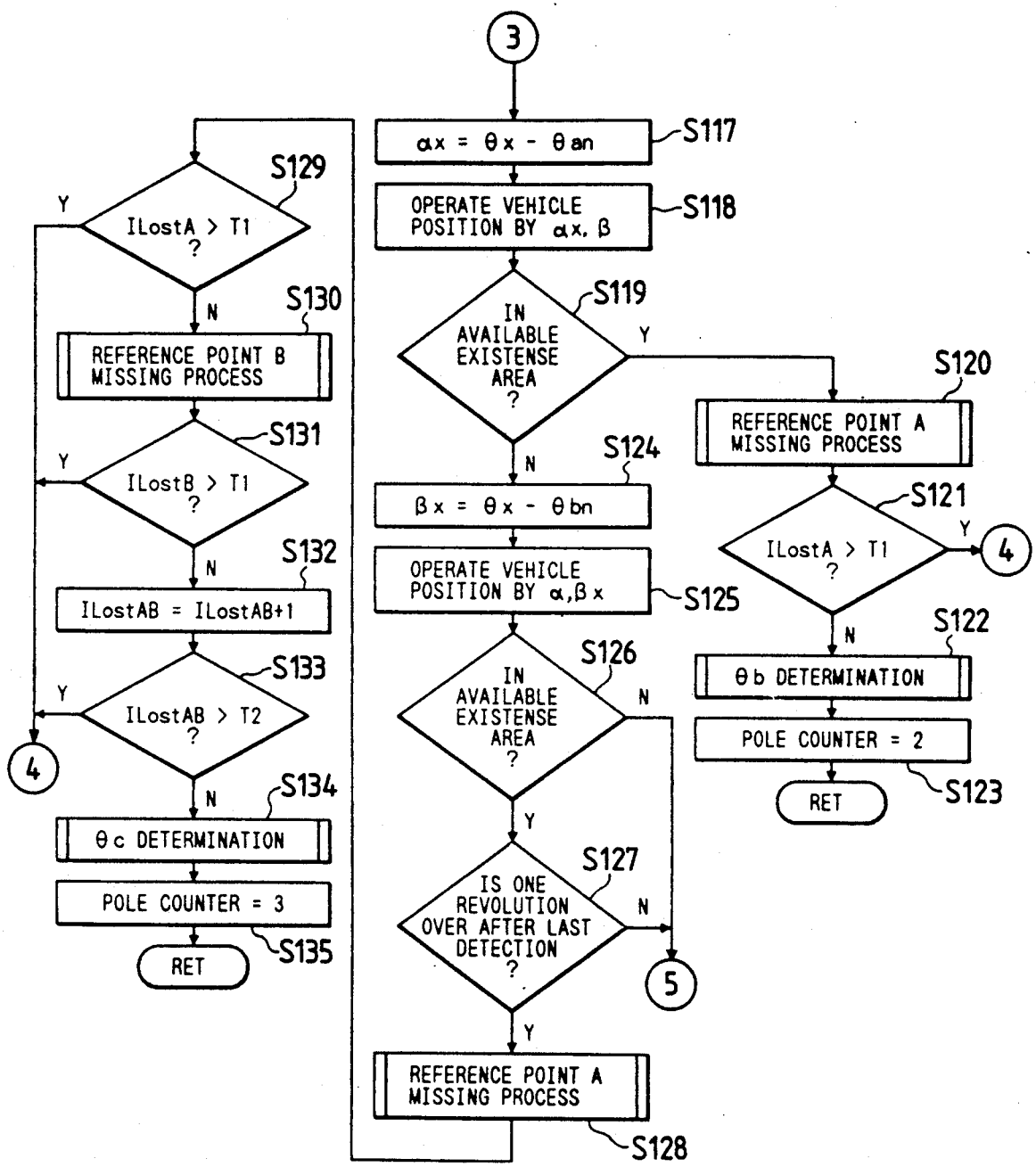

SYSTEM FOR DETECTING POSITION OF MOVING VEHICLE AND SYSTEM FOR DETECTING REFERENCE POINTS THEREFOR

BACKGROUND OF THE INVENTION

1. Field of the Invention

The present invention relates to a position-detecting system and a reference points detecting system therefor to be used in a moving vehicle, and more particularly to a position-detecting system and a reference points detecting system for use in a moving vehicle such as a moving automobile, an unmanned mobile and carrying device in a factory, or an automated vehicle for use in agriculture, civil engineering machinery and the like.

2. Description of the Prior Art

Heretofore, as a system for detecting a current position of a moving body such as the moving vehicles as described above, there has been proposed a system provided with a means for scanning a light beam emitted from a moving body in the circumferential direction or every azimuthal direction centering around the moving body, light-reflecting means for reflecting to return the light beam in the direction of incident light and secured at at least three positions apart from the moving body, and a beam receiver means for receiving light reflected from the light-reflecting means (Japanese Patent Laid-open No. 67476/1984).

In the above mentioned prior art, differential azimuths between adjoining two of three light-reflecting means centering around the moving body are detected on the basis of received beam output of the light-receiving means, and then a position of the moving body is operated based on the detected differential azimuths and positional information of the light-reflecting means which have been previously set.

In the above described system, however, there has been such a case where light beam emitted from a beam source mounted on the moving vehicle could not be directed to the light-reflecting means positioned at reference points because of an inclination or vibration of the moving vehicle, or a case where the light-receiving means on the moving vehicle receives light reflected from the objects other than the expected light-reflecting means those described above.

When real reflected light is not positively received by a light-receiving means, the position of the moving vehicle is erroneously calculated so that the moving vehicle cannot be traveled along a prescribed course.

As means for solving the above described problem, te present inventors proposed the following technique in U. S. Pat. Ser. No. 67/420063 filed on Oct. 11, 1989. Means is provided which receives the light reflected by light-reflecting means disposed at the reference points and detects the azimuth of the light-reflecting means based on the receiving interval of the reflected lights, and based on the azimuth of the light-reflecting means detected by the detecting means in the previous scanning cycles, the azimuth of the light-reflecting means to be detected in the next scanning is predicted.

If no light-reflecting means is detected in the above described predictive direction in the next scanning, it is deemed that the light-receiving means to be detected has been missed, the direction of the missing light-reflecting means is estimated, and the position and advance direction of the moving vehicle are calculated on the basis of the estimated azimuth.

In the above patent specification, however, the predicted azimuth of the light-reflecting means to be detected in the next scanning is set as a predictive azimuth having a particular width or allowance angle. And te allowance angle is set at a constant value regardless of the distance from the moving vehicle to the reference point. Therefore, if the distance between the reference point and the moving vehicle is long, the considerable portion in front of and behind the scanning direction constitutes a range which is contained within the allowance angle.

Accordingly, if the reflected light from any other wrong reflecting object existing within the allowance angle and near the expected light-reflecting means is received before the light reflected by the expected light-reflecting means, the reflected light from the wrong reflecting object may be determined to be the true reflected light from the expected light-reflecting means disposed at a reference point.

When the reflected light from the light-reflecting means is not detected, the azimuth of the light-reflecting means which is not detected this time is estimated according to the azimuth of the light-reflecting means which was detected before, so if such estimation process is repeated, the difference between the actual value and the estimated value may accumulatively increase.

SUMMARY OF THE INVENTION

It is an object of the present invention to provide a system for detecting a position of a moving vehicle, which is suitable for reducing misjudging the light beam signal from an object other than the expected light-reflecting means as that from te expected light-reflecting means.

The present invention is particularly characterized by a system for detecting reference points to calculate a position of a moving vehicle wherein the position of the moving vehicle is detected by scanning the light beam generated from the moving vehicle in the circular direction centering around itself and receiving the light reflected by light-reflecting means disposed at at least three reference points, the system comprising a means for detecting the azimuth of each light-reflecting means in respect of the moving vehicle on the basis of the receiving interval of the reflected light from the light-reflecting means, a means for calculating the current position of the moving vehicle on the basis of azimuths detected in the azimuth detecting means, a means for calculating the available existence area in which the moving vehicle is predicted to exist at the next azimuth detection time, on the basis of the current position of the moving vehicle calculated in the position calculating means, a means for comparing the position of the moving vehicle calculated on the basis of the detected azimuth at the next azimuth detection time with the available existence area, and a judging means for judging that the detected azimuth is that of the light-reflecting means disposed at the expected reference point if the calculated moving vehicle position is in the available existence area, while the detected azimuth is not that of the light-reflecting means disposed at the expected reference point if the calculated moving vehicle position is not in the available existence area.

In the present invention having the above construction, when the light from an object other than the expected light-reflecting means is detected, the detected light from the wrong light-reflecting means can be excluded or disregarded, so that large deviation from the traveling course, due to the erroneous detection of light from an object other than the expected light-reflecting means, can be prevented.

BRIEF DESCRIPTION OF THE DRAWINGS

FIG. 3 is a flowchart showing a steering control;

FIG. 4 constituting FIGS. 4A-4F is a flowchart showing a processing for discriminating reference points;

FIG. 5 constituting

FIG. 6 constituting

DETAILED DESCRIPTION OF THE PREFERRED EMBODIMENTS

Figure 11:
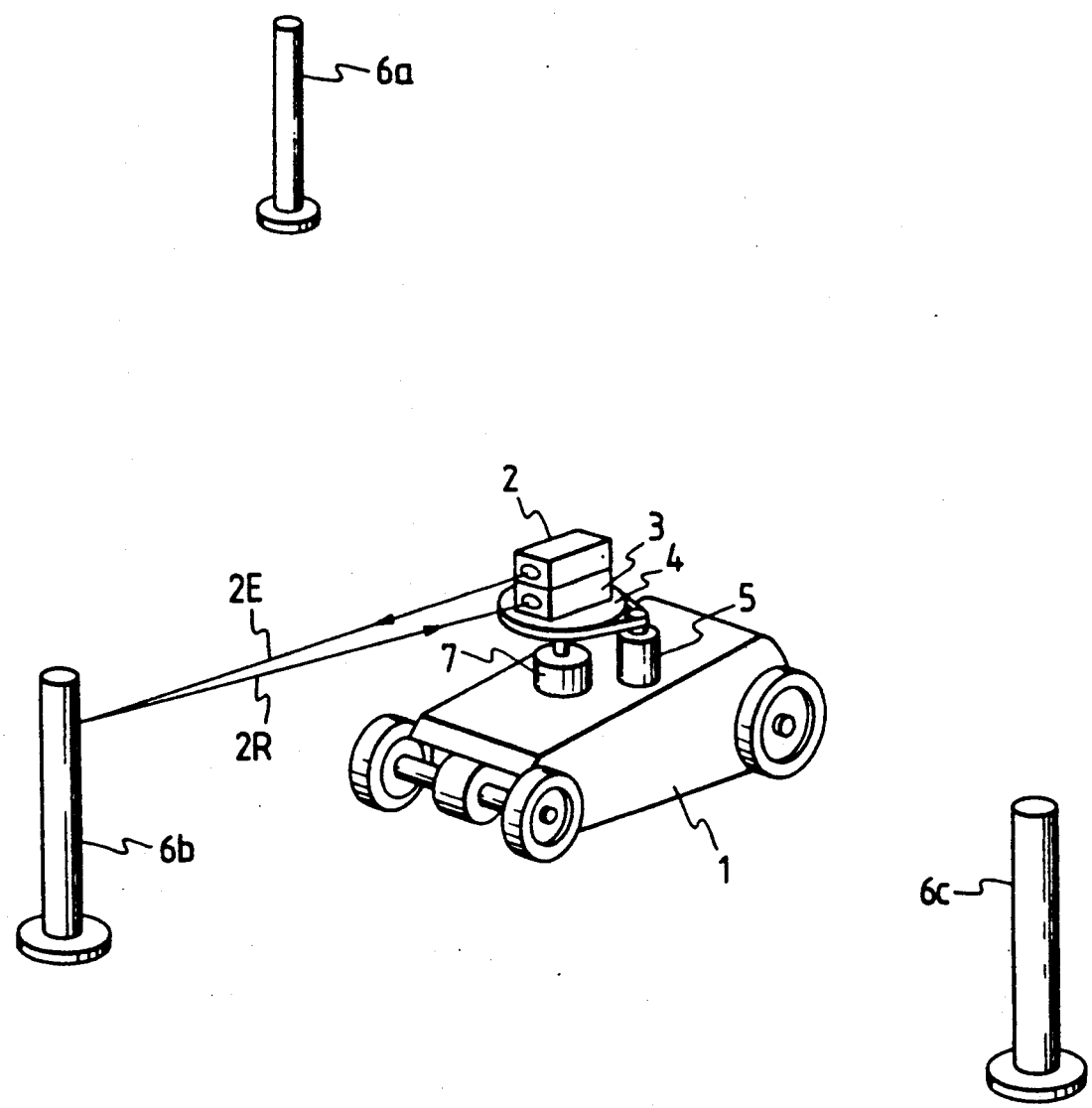
FIG. 11 is a perspective view showing a situation of arrangement of the moving vehicle and reflectors.

An embodiment of the present invention will be described hereinbelow by referring to the accompanying drawings. FIG. 11 is a perspective view showing a state of arrangement in respect of a moving vehicle carrying the control system according to the present invention and each of light reflectors disposed in an area in which the moving vehicles travels.

In FIG. 11, the moving vehicle 1 is one for use in agricultural working such as a lawn mower and the like. A rotating table 4 driven by a motor 5 is mounted on the upper part of the moving vehicle 1. The rotating table 4 mounts a beam source 2 for emitting light beam 2E and a beam receiver 3 for receiving light 2R reflected by each of the reflectors 6a-6c for reflecting the light beam 2E. The beam source 2 is provided with a light beam emitting means (light-emitting diode) and the beam receiver 3 is provided with a means for receiving incident light to convert it into an electrical signal (photodiode) (both of them are not shown). Furthermore a rotary encoder 7 is disposed so as to be interlocked with a drive shaft of the rotating table 4, so that when pulses output from the rotary encoder 7 are counted, a turning angle of the rotating table 4 can be detected.

The reflectors 6a-6c are located around a working area of the moving vehicle 1. Each of the reflectors 6a-6c has a reflection surface reflecting incident light in the incident direction and for this purpose, a so-called corner cube prism which has been conventionally available on the market and the like may be used.

Figure 1:
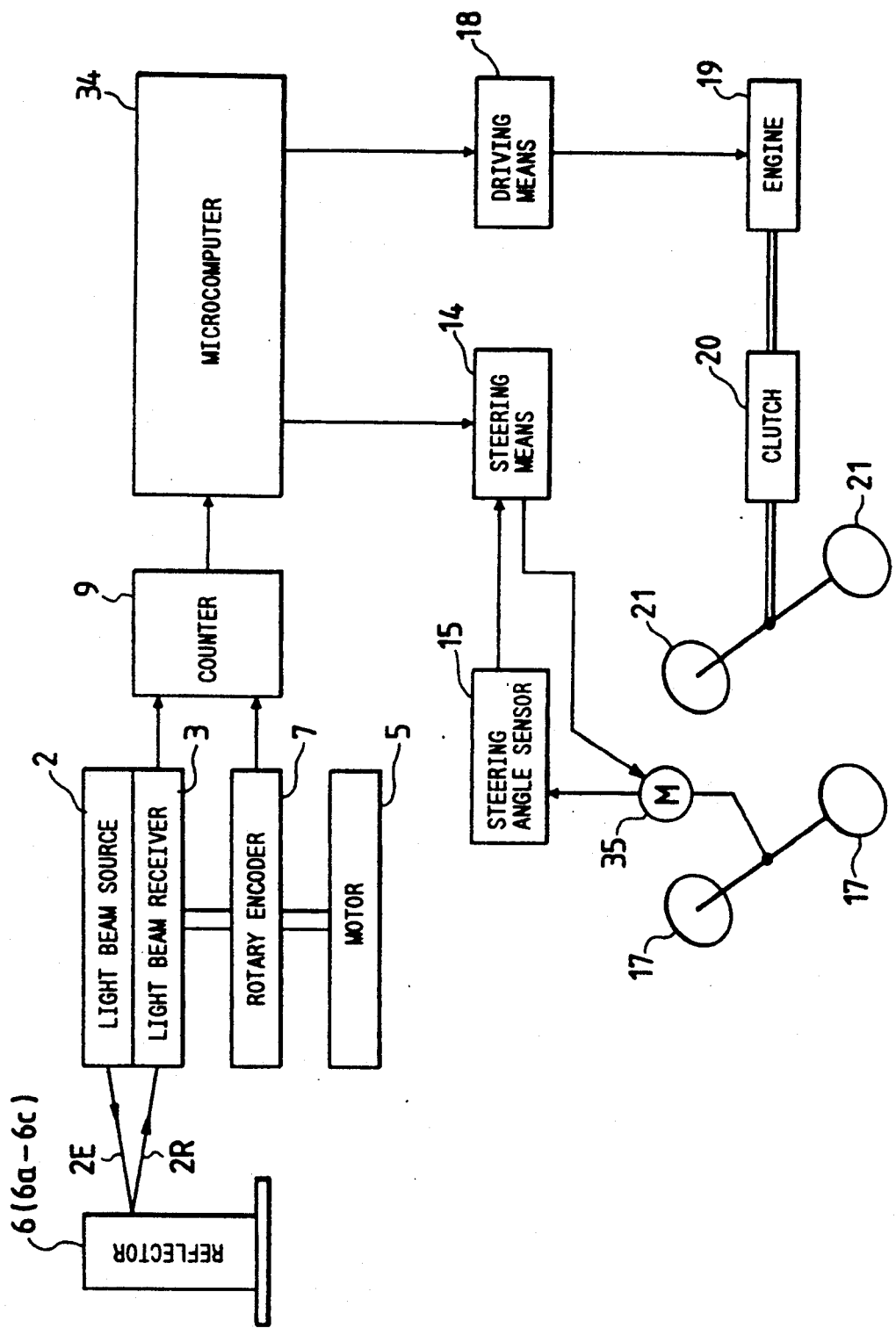
FIG. 1 is a block diagram showing an embodiment of the present invention.
Figure 2:
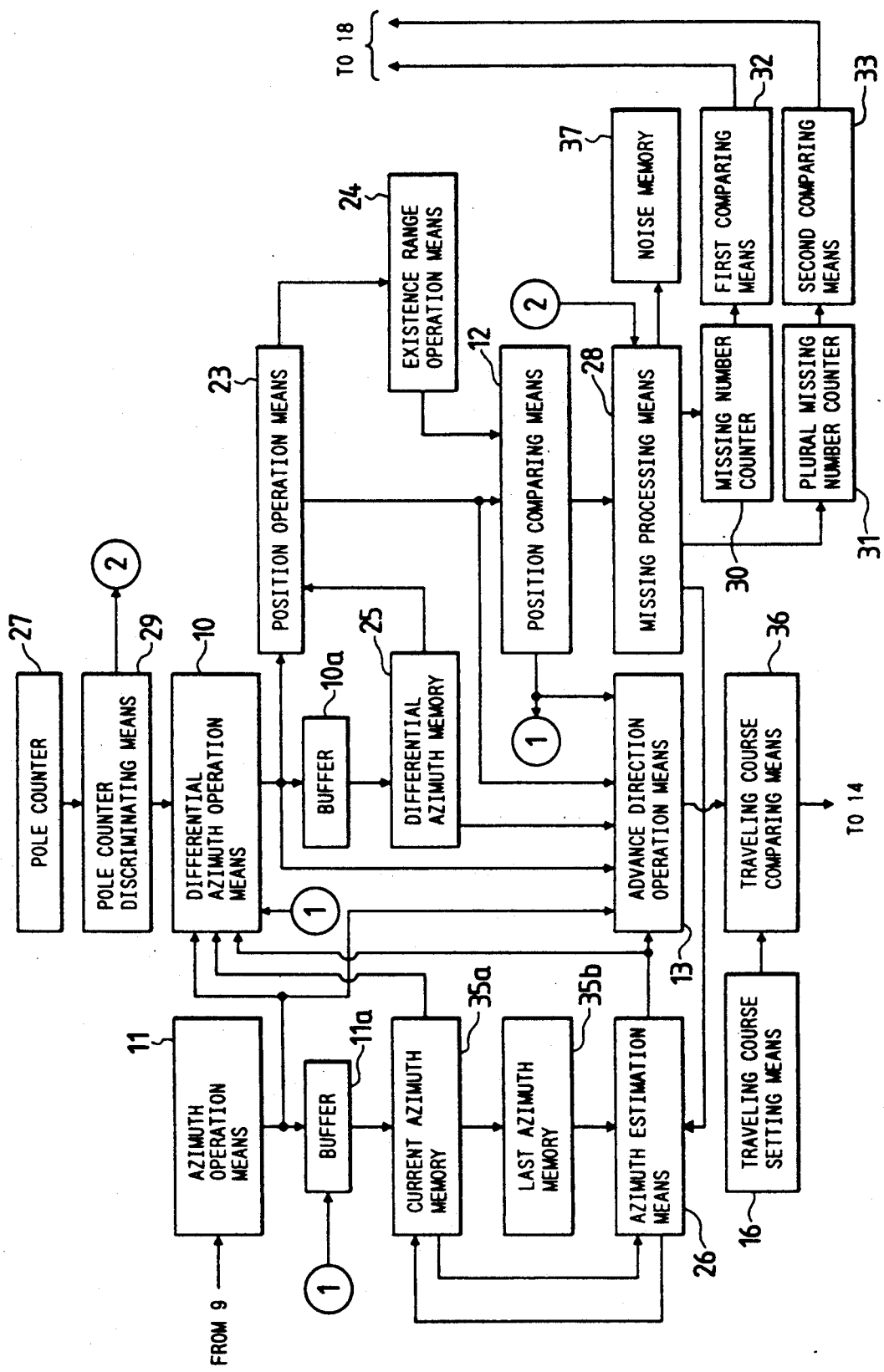
FIG. 2 is a detailed block diagram showing a microcomputer means of FIG. 1.
Figure 4A:
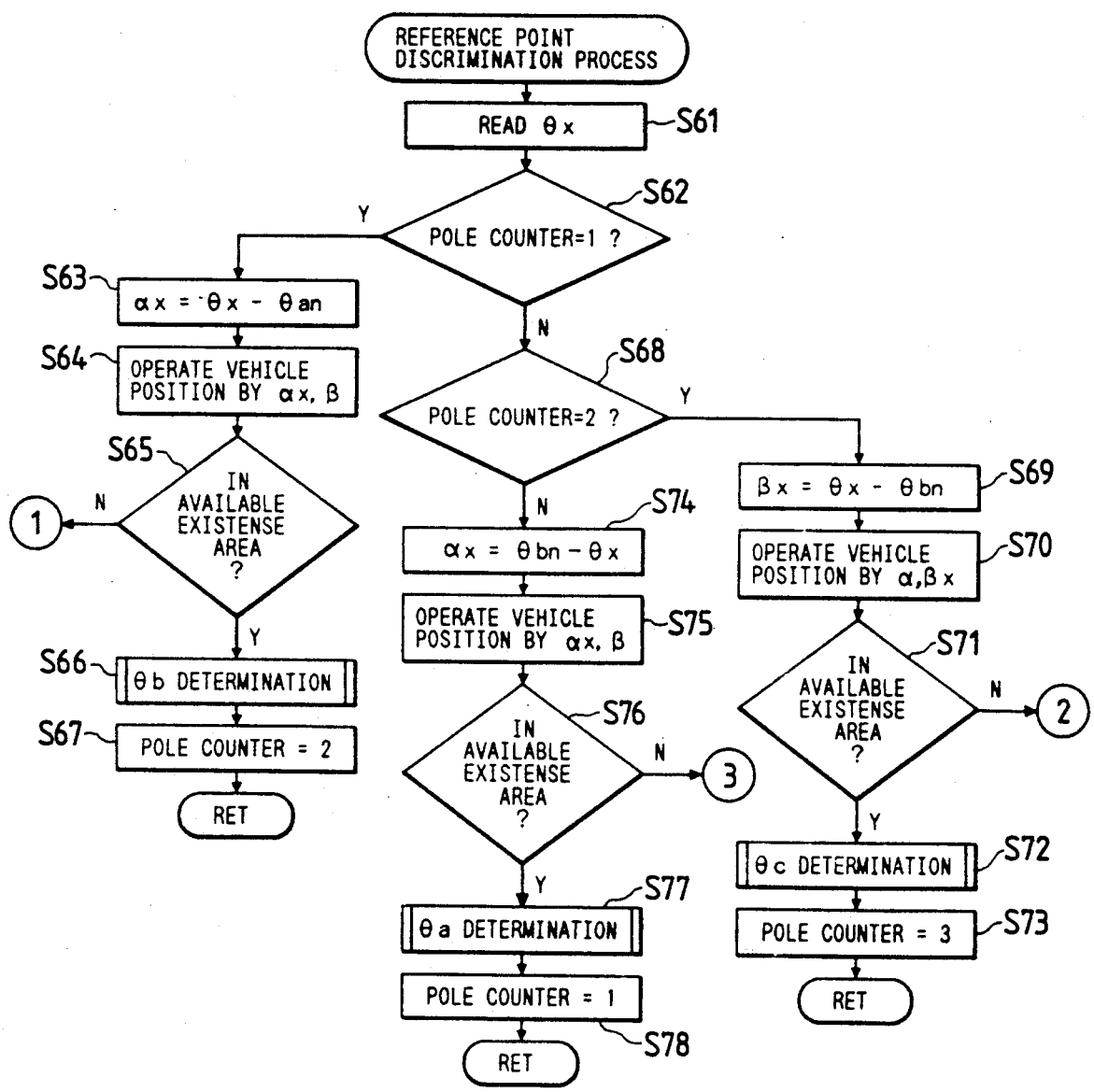
Figure 4B:
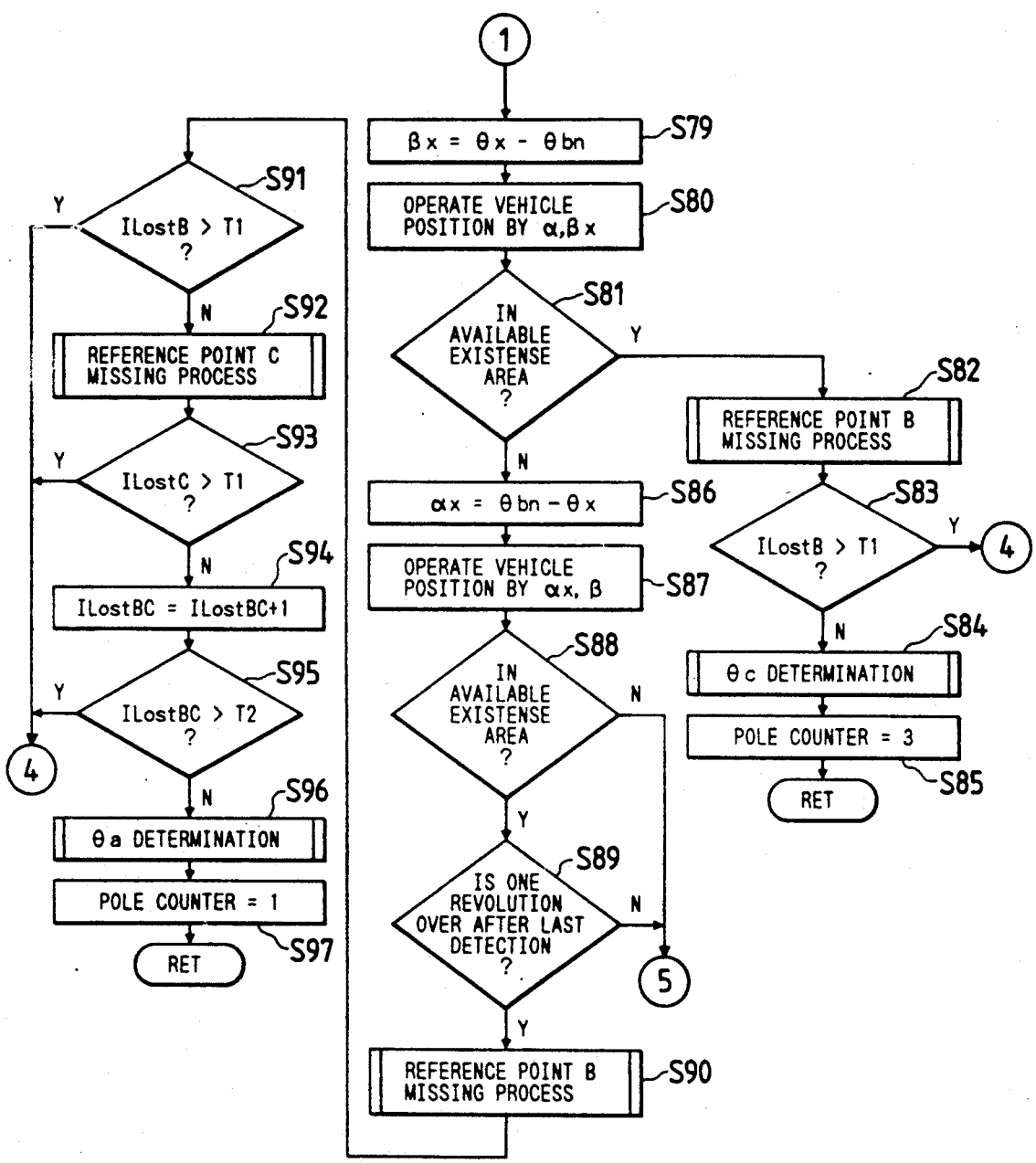
Figure 4C:
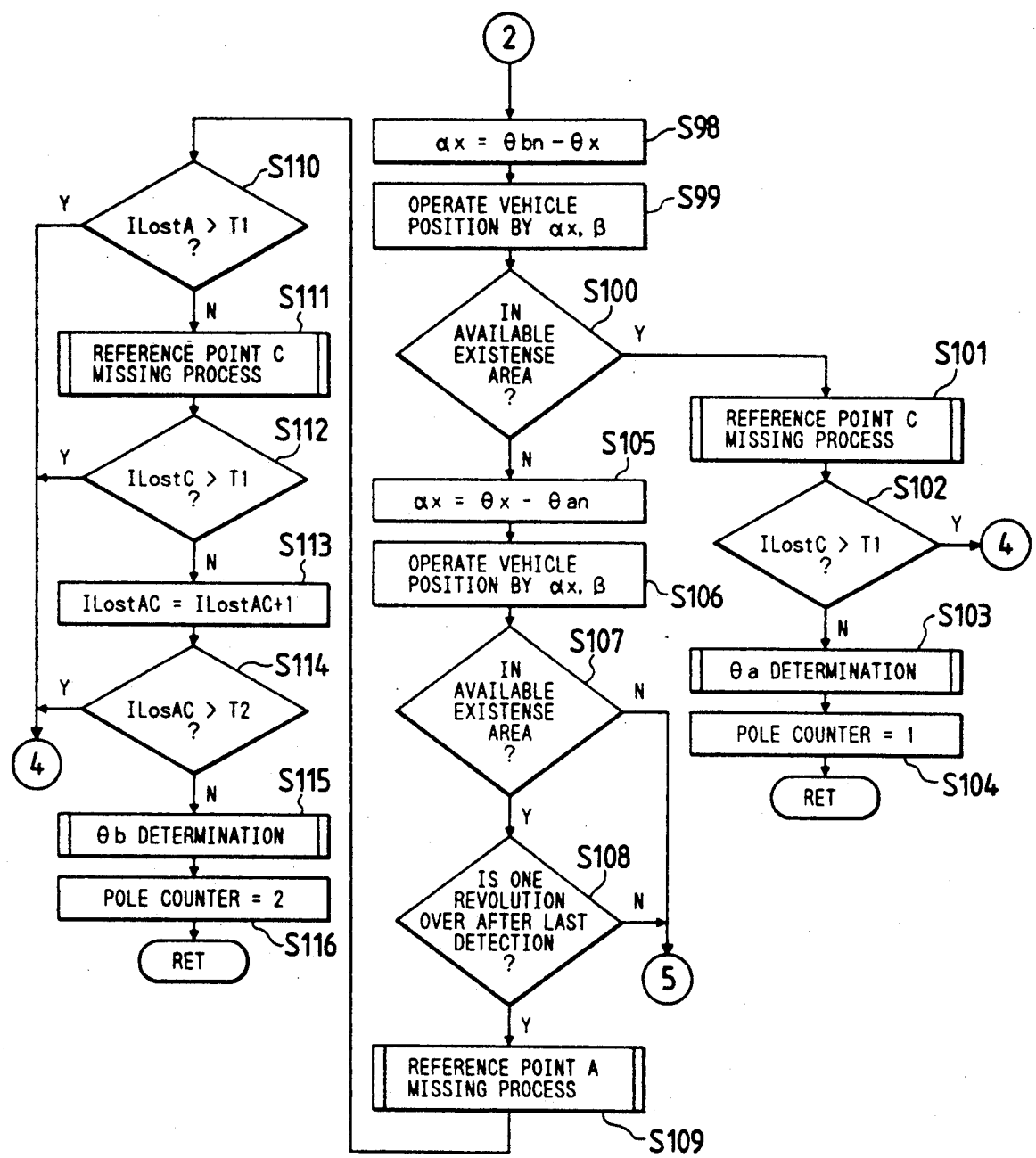
Figure 4E:
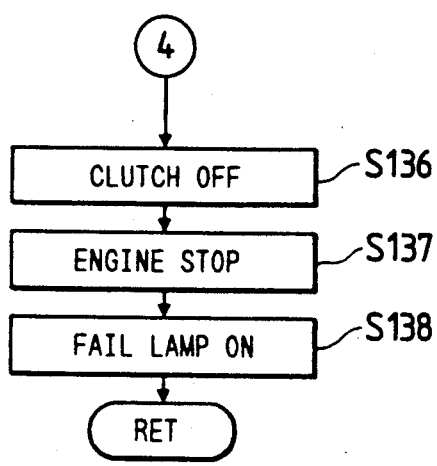
Figure 4F:
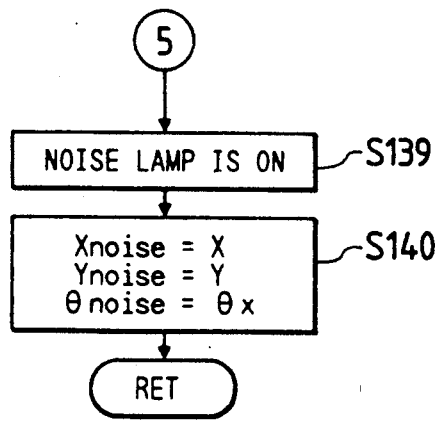

Next, the construction of the control system in the present embodiment will be described in accordance with the block diagrams of FIGS. 1 and 2 wherein the light beam 2E emitted from the beam source 2 is scanned in a rotating direction of the rotating table 4 and the light beam 2E is reflected by one of the reflectors 6a-6c. The light beam 2R reflected by one of the reflectors 6a-6c is introduced into the beam receiver 3.

In a counter 9, the number of pulses output from the rotary encoder 7 is counted in accordance with rotation of the rotating table 4. The count value of the pulses is transferred to a microcomputer means 34 in every reception of the reflected light beam in the beam receiver 3.

In the microcomputer means 34, the deviation of the current position of the moving vehicle 1 in respect of the expected traveling course in calculated, and the calculated result is inputted to a steering means 14. Also, from the microcomputer means 34, a travel stop signal of the moving vehicle 1 is outputted to a driving means 18.

In the steering means 14, a steering motor (M) 35 connected to front wheels 17 of the moving vehicle is driven on the deviation of the current position of the moving vehicle 1 in respect of the expected traveling course. An angle of steering for the front wheels 17 driven by the steering motor 35 is detected by means of a steering angle sensor 15 mounted on the front wheels of the moving vehicle 1, and fed back to the steering means 14.

A driving means 18 controls starting and stopping of an engine 19 as well as operation of a clutch 20 for transmitting the power of the engine 19 to rear wheels 21.

The functions and construction of the microcomputer means 34 is described with reference to FIG. 2.

In an azimuth operation means 11, based on the number of pulses inputted from the counter 9 each time a light beam signal is detected, the incident azimuth of the light beam signal in respect of the advance direction of the moving vehicle is calculated. In a buffer 11a, the calculated azimuth is received. The azimuth received in the buffer 11a is transferred to and stored in a current azimuth storing means 35a according to the comparative result in a position comparing means 12. In addition, the value in the current azimuth storing means 35a is also updated by the estimated azimuth which is calculated in an azimuth estimation means 26 according to the result of a missing processing means 28. In this way, in the current azimuth storing means 35a and a last azimuth storing means 35b, are respectively stored the azimuths detected in the current and last detection cycles or their estimated values of the respective reflectors placed at the three reference points, which were calculated in thhe azimuth operation means 11.

When the value in the current azimuth storing means 35a is updated by te value in the buffer 11a or the value calculated in the azimuth estimation means 26, the value in the last azimuth storing means 35b renewed by the value stored in the current azimuth storing means 35a. For instance, the current and last azimuth storing means 35a and 35b can be comprised of a set of shift registers.

In a differential azimuth operation means 10, based on the incident azimuth of a light beam calculated in the azimuth operation means 11 and the azimuth detected in the current detection cycle which is stored in the current azimuth storing means 35a, the differential azimuth as viewed from the moving vehicle between the source of the above-mentioned light beam signal and the light reflector 6 adjoining the above-mentioned light beam source and having its azimuth already detected is calculated. Between which light reflector the differential azimuth must be calculated in respect of the source of the above-mentioned light beam signal is determined by the value of a pole counter 27 discriminated in a pole counter discriminating means 29 and the comparative result of the position comparing means 12.

The count value in the pole counter 27 is renewed to a count value corresponding to each reflector 6 each time the reflector placed at one of three reference points A, B and is detected. Therefore, by checking the count value in the pole counter 27 when a received light beam signal is detected, which reflector 6 from which the current received light beam signal came can be determined.

In this embodiment, the count values of "1", "2" and "3" correspond to the reference points A, B and C, respectively, and the light beam receiver 3 scanning in the order of the reference points A, B and C. Accordingly, if the current value of the pole counter 27 is "1" when it has detected the received light beam signal, for instance, it will be found that the received light beam signal is from the reflector 6 disposed at the reference point B which is to be detected subsequently to the reference point A corresponding to this count value "1".

In fact, however, since the light beam from a light-emitting source other than the reflector 6 may have been detected by the light beam receiver 3, the source of the light beam is assumed to be any reflector 6 for the time being based on the count value, and it is determined in processing described later which reflector 6 it came from or whether it is the light from a light-emitting source other than the reflector 6.

The differential azimuth operated in the differential azimuth operation means 10 is stored in the buffer 10a. In a moving vehicle position operation means 23, the current position of the moving vehicle is calculated on the basis of the azimuth calculated in the differential azimuth operation means 10 and the differential azimuth which has been stored in a differential azimuth storing means 25.

In a moving vehicle existence range operation means 24, based on the position of the moving vehicle 1 which was calculated in the current cycle, the positional area or range in which the moving vehicle 1 is expected to exist when a light beam is subsequently received in the current cycle is established in a method described later.

To the position comparing means 12, the position of the moving vehicle 1 calculated on the basis of the received light beam signal in the current cycle and the positional range predicted in the moving existence range operation means 24 are inputted, and judgment is made as to whether or not the actual moving vehicle 1 position at the time of receiving a light beam signal in the current cycle is in the predicted positional range.

If the current position of the moving vehicle 1 exists in the predicted positional range, the advance direction of the moving vehicle 1 is calculated in a moving vehicle's advance direction operation means 13 on the basis of the azimuth operated in the azimuth operation means 11, the differential azimuth calculated in the differential azimuth operation means 10 and the differential azimuth stored in the differential azimuth storing means 25. The calculated position and advance direction of the moving vehicle 1 are compared in a traveling course comparing means 36 with the traveling course set in a traveling course setting means 16. The comparative result is inputted to the steering means 14 to determine the steering amount.

If the current position of the moving vehicle 1 does not exist in the predicted positional range, the reflector 6 is deemed to have been missed and a missing processing is performed in a missing processing means 28.

In the missing processing, an initiation command is issued to an azimuth estimation means 26, where the estimation of the azimuth of the missing reflector 6 is made on the basis of the values in the current and last azimuth storing means 35a and 35b. The position and advance direction of the moving vehicle 1 are calculated on the basis of the estimated azimuth and differential azimuth calculated by using the estimated azimuth, and the differential azimuth stored in the differential azimuth storing means 25.

In the missing processing means 28, a judgment is made as to which reflector or reflectors 6 have been missed based on the count value of the pole counter 27 discriminated in the pole counter discriminating means 29, and a missing number counter 30 is incremented, if any single reflector has been missed, while, a plural missing number counter 31 is incremented, if two adjoining reflectors 6 are missed.

In a first comparing means 32, the value in the missing number counter 30 and a threshold value T1 therefor are compared, and if the counter value exceeds the threshold value T1, a moving vehicle stop signal is outputted to the driving means 18. In a second comparing means 33, the value in the plural missing counter 31 and a threshold value T2 therefor are compared, and if the counter value exceeds the threshold value T2, a moving vehicle stop signal is outputted to the driving means 18.

If the detected signal of the light beam receiver 3 is from an object other than the reflector 6, it is judged to be a noise, and the position of the moving vehicle 1 when the noise is received and the azimuth of the noise source as viewed from the moving vehicle 1 are stored in a noise storing means 37.

Since missing of two adjusting reference points is a more serious situation than missing a single reference point, a larger number of times is generally set for the threshold value T1 than that for the threshold value T2. In other words, when two adjoining reference points are missed, the moving vehicle 1 is controlled to stop in good time so as not to increase significantly the detection error. When it is judged by the position comparing means 12 that light reflected from the expected reflector 6 is received, the number of times "0" are reset in the missing number counter 30 and the plural missing number counter 31, respectively.

A value in the pole counter 27 is renewed in the case when it is judged by the position comparing means 12 that the expected reflector 6 has been normally detected as well as the case when missing processing has been completed.

Figure 7:
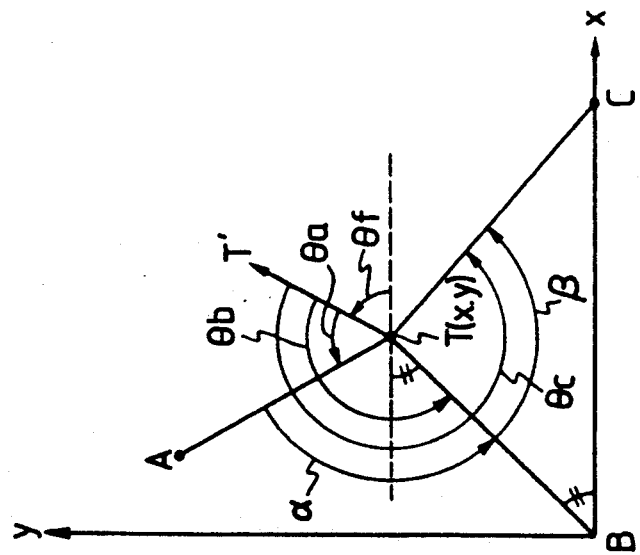
FIG.7 is an explanatory graphical representation for explaining the principle of detecting traveling azimuths of the moving vehicles.

In FIG. 7, disposed positions of the reflectors 6a–6c are indicated by points A, B and C (hereinafter referred to as "reference points A, B and C"). The positions of the reference points are represented by an x-y coordinate system wherein the reference point B is the origin, and a line extending between the reference points B and C is the x-axis. The current position of the moving vehicle 1 is T(x, y) and advance direction with respect to the x-axis is $\theta f$. The differential azimuths of the reference points A, B and C with respect to the advance direction TT′ as reference are, respectively, $\theta a$, $\theta b$ and $\theta c$, and differential azimuths between the reference points A and B is $\alpha$, and between the reference points B and C is $\beta$.

The equation for calculating the advance direction $\theta f$ of the moving vehicle 1 on the basis of the azimuths $\theta a$, $\theta b$ and $\theta c$, and differential azimuths $\alpha$ and $\beta$ is stored in the advance direction operation means 13, and the equation for calculating the current position T(x, y) of the moving vehicle 1 on the basis of the differential azimuths $\alpha$ and $\beta$ is stored in the moving vehicle position operation means 23.

An example of the calculation equations stored in the operation means 13 and 23 is given in detail in the specifications of U.S. Pat. Ser. Nos. 344,574 and 362,630 (now U.S. Pat. No. 4,947,324), so the description thereof is omitted here.

Figure 10:
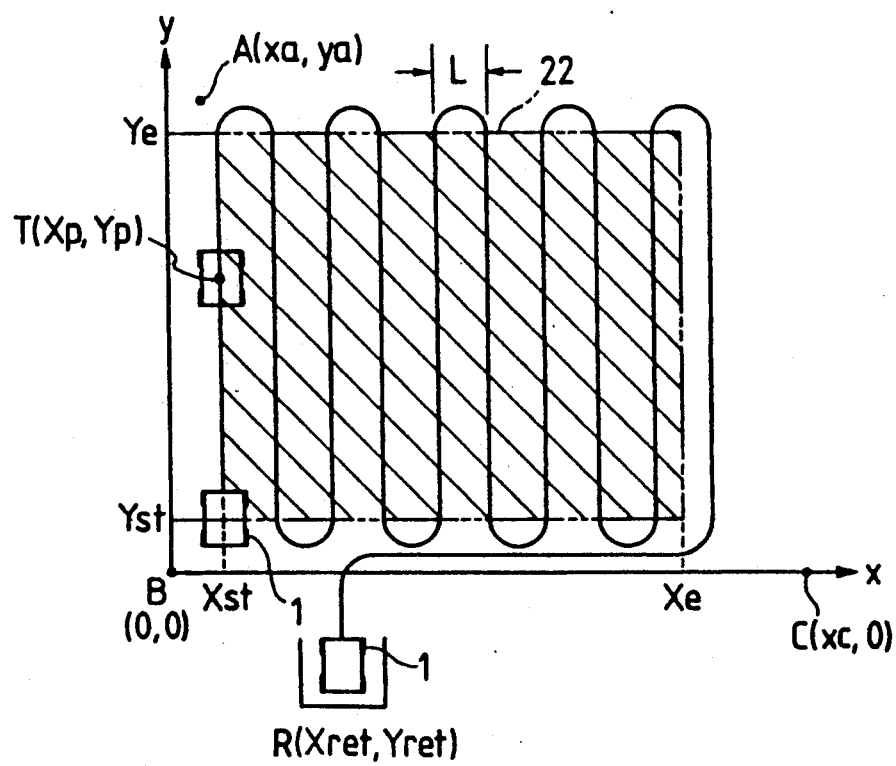
FIG. 10 is a graphical representation showing a situation of arrangement of a traveling course of a moving vehicle and reflectors.

Next, steering control for the moving vehicle 1 will be described hereinbelow. FIG. 10 is a schematic diagram showing a traveling course of the moving vehicle 1 and the coordinates of the reflectors 6, and FIG. 3 is a flowchart illustrating a procedure for steering control.

In FIG. 10, points A, B and C indicate positions at which the reflectors 6a-6c are disposed, and the current position T and the working area 22 of the moving vehicle 1 are represented by a coordinate system wherein the point B is fixed as the origin, and a straight line extending between the points B and C is defined as the x-axis. (Xret, Yret) indicate coordinates of a returning position R of the moving vehicle 1, and the working area 22 is a quadrilateral region including four apexes of the points represented by four coordinates (Xst, Yst), (Xst, Ye), (Xe, Yst) and (Xe, Ye). In this case, the current position of the moving vehicle 1 is represented by T (Xp, Yp).

For the simple explanation, while an example wherein four sides of the working area 22 are respectively parallel to the x- or y-axes is shown in FIG 10, other directions and/or shapes of the working area may be selected so far as the points A–C are disposed around the working area 22.

In accordance with the flowchart shown in FIG. 3, a control procedure will be described hereinbelow in which it is assumed that the moving vehicle 1 reciprocates in parallel to the y-axis as in the traveling locus of FIG. 10, and the pitch therefor is L.

First of all, is step S1, the moving vehicle 1 is transferred by means of, for example, radio control from a point R to a position where working is started.

In step S2, the beam emitter 2 and the beam receiver 3 are rotated while stopping the moving vehicle 1 to detect the respective reference points A, B and C, and at the same time azimuths of the respective reference points viewed from the moving vehicle 1 are stored in the current azimuth storing means 35a.

In step S3, Xst is set as an X-coordinate Xn for a traveling course thereby to fix the traveling course.

Traveling of the moving vehicle 1 is started in step S4.

It is judged in step S5 whether or not reflected light from any reference point is received by the beam receiver 3. The step 5 is repeated until the reflected light is detected. When reflected light has been detected, the operation proceeds to step S6, and a subroutine process for discriminating reference points which will be described hereinafter is carried out.

The present position (Xp, Yp) and an advance direction of the moving vehicle 1 is operated in step S7.

In step S8, a deviation amount of the traveling course ($\Delta X = Xp - Xn$, $\Delta\theta f$) is operated, and a steering angle is controlled in step S9 by the steering means 14 in response to the amount of deviation calculated.

In step S10, it is judged that either the moving vehicle 1 travels towards the direction going away from the origin (forward direction) or the direction approaching the origin (reverse direction) in the y-axial direction.

In case of forward direction, it is judged whether one stroke has been finished (Yp>Ye) or not in step S11, while in case of reverse direction, it is judged whether one stroke has been finished (Yp<Yst) or not in step S12. When it is judged that one stroke has not been finished in either step S11 or step S12, processings returns to steps S5.

In case where it is judged that one stroke has been finished in either step S11 or S12, it is judged in the following stpe S13 whether all the strokes have been finished (Xp>Xe) or not.

When all the strokes have not been finished, the procedure shifts from step S13 to step S14 to effect U-turn control of the moving vehicle 1. U-turn control is carried out in accordance with a different method from the one for steering control in a straight traveling course wherein the positional information of the moving vehicle 1 operated by the position-advance direction operating means 13 is fed back to the steering means 14.

More specifically, it is adapted that the vehicle 1 is traveled while fixing a steering angle thereof at a predetermined angle in a turning course, and the moving vehicle returns to steering control in a straight traveling course when at least one of azimuths of the respective reflectors 6 viewed from the vehicle 1 substantially falls in a predetermined range of corresponding azimuth. The details of U-turn control for traveling the moving vehicle along the turning course is described in detail in U.S. Pat. No. 4,947,324.

In step S15, a pitch L is added to Xn thereby operating (Xn+L) and the following traveling course is set. When set the following traveling course, the procedure returns to step S5 and the above described processings are repeated.

When all strokes have been completed, the moving vehicle returns to the return position R(Xret, Yret) in step S16, and the travel thereof stops in step S17.

Next, the processing for discriminating reference points in the step S6 will be described hereinbelow.

Figure 8:
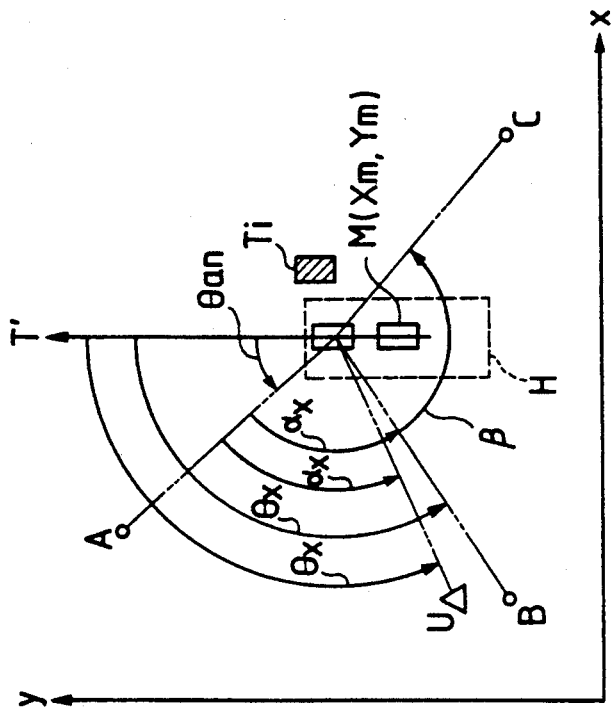
FIG. 8 is an explanatory graphical representation for explaining the principle of the processing for discriminating reference points.

First, the reference point discriminating process in this embodiment is summarized. FIG. 8 is an illustration to explain the reference point discriminating process. The figure shows the relationship between the moving vehicle 1 and the reference points when a judgment is made as to whether or not the reference point B has been correctly detected in the current scanning cycle, after the reference point B was correctly detected in the last scanning cycle.

In this figure, the position of the moving vehicle 1 when the reference point B was detected in the last cycle was M(Xm, Ym), and the available existence area H of the moving vehicle 1 when the point B is detected in the current cycle is set at a position (Xm±$\Delta$x, Ym±$\Delta$y). The range H has deviations of ±$\Delta$x and ±$\Delta$y in the X- and Y- directions from the last position M, respectively. As to such deviations, either only positive or negative ones may be set depending on the advance direction of the moving vehicle 1.

In the current scanning cycle, if the position of the moving vehicle 1 calculated from the differential azimuth $\alpha x$ calculated on the basis of the detected azimuth $\theta x$, namely ($\theta x - \theta an$) and the known differential azimuth β is in the available existence area, it is judged that the reference point B has been correctly detected.

If the light beam from a wrong light-emitting source U is detected before detection of the reference point B in the current scanning cycle, the detected azimuth θx takes a value smaller than the θx obtained when the reference point is correctly detected, and the differential azimuth αx calculated on the basis of this smaller azimuth θx also takes a smaller value. Therefore, the position of the moving vehicle 1 calculated on the basis of the differential azimuths αx and β is in an area Ti which is departed from the existence available area H. As a result, it can be judged that the detected light is from a light-emitting source other than the reference point.

If any reference point is missed, the calculated position of the moving vehicle 1 distinguishably deviates from the available existence area, so the missing process of the reference point is performed. That is, the current azimuth is estimated on the basis of the azimuths which were detected in the current and last cycles, and the position of the moving vehicle 1 is calculated on the basis of the estimated azimuth.

In the following description, the azimuths of the reference points A, B and C already determined in the last cycle are θan, θbn and θcn, respectively, and the determined differential azimuths calculated on the basis of these azimuths θan, θbn and θcn are represented by α and β. Also, the differential azimuths which are temporarily determined by the latest detected azimuths θx and the azimuths θan, θbn and θcn detected in the last detection cycle are represented by αx and βx.

The reference point discriminating procress described above will be further described according to the flowchart of FIG. 4.

In step S61, the azimuth of the reflecting object in respect of the advance direction of the moving vehicle 1, calculated on the basis of the latest received light beam signal, is read in as θx.

In step S62, a judgment is made as to whether or not the count value in the pole counter 27 is "1", that is, whether or not the reference point detected just before detecting the latest received light beam is A which corresponds to the count value "1". If the judgment is positive, the process goes to step S63 on the assumption that the reflecting object is a reflector 6b placed at the reference point B which is to be detected after the reference point A.

In step S63, a temporary differential azimuth αx is calculated based on the difference between the detected azimuth θx and the known azimuth θan of the reference point A.

In step S64, the position of the moving vehicle 1 is calculated in the moving vehicle position operation means 23 on the basis of the temporary differential azimuth αx and the known differential azimuth β.

In step S65, it is judged whether or not the calculated position of the moving vehicle 1 is in the available existence area obtained based on the position which was calculated on the basis of the differential azimuths α and β when the reference point B was detected in the last cycle.

If the moving vehicle 1 is in the available existence area, the judgment that "the detected reflecting object is a reflector 6b placed at the reference point B" which was supposed from the value of the pole counter 27 in the above step S62 is deemed to be correct, and step S66 is entered to carry out the processing for determining the azimuth θb of the reference point B.

In step S67, since it has been determined in the above processings that the latest reference point is B, the count value in the pole counter 27 is stepped to "2" which corresponds to the reference point B.

In step S62, if it is judged that the count value in the pole counter 27 is not "1", the process goes to step S68 where a judgment is made as to whether or not the count value in the pole counter 27 is "2", that is, the last received signal is the detected signal of the light beam from the reflector 6b at the reference point B.

If the judgment is positive in step S68, the process goes to step S69 on the assumption that the reflecting object is a reflector 6c.

In step S69, a temporary differential azimuth βx is calculated based on the difference between the detected azimuth θx and the known azimuth θbn of the reference point B.

In step S70, the position of the moving vehicle 1 is calculated in the moving vehicle position operation means 23 on the basis of the temporary differential azimuth βx and the known differential azimuth α.

In step S71, it is judged whether or not the calculated position of the moving vehicle 1 is in the available existence area obtained based on the position which was calculated on the basis of the differential azimuths α and β when the reference point C was detected in the last cycle.

If the moving vehicle 1 is in the available existence area, the judgment that "the detected reflecting object is a reflector 6c placed at the reference point C" which was supposed from the value of the pole counter 27 in the above step S68 is deemed to be correct, and step S72 is entered to carry out the processing for determining the azimuth θc of the reference point C.

In step S73, since it has been determined in the above processings that the latest reference point is C, the count value in the pole counter 27 is stepped to "3" which corresponds to the reference point C.

If the judgments in steps S62 and S68 are both negative, the process goes to step S74 on the assumption that the reflecting object is a reflector 6a disposed at the reference point A.

The processings of the following steps S74–S78 are similar to the above steps S63–S67 or S69–S73, so the description thereof is omitted.

In the above step S65, if it is judged that the moving vehicle 1 is not lying in the available existence area, it is assumed that the detected azimuth θx is that of a reflector 6c at the reference point C.

In step S79, a temporary differential azimuth βx is calculated based on the difference between the detected azimuth θx and the known azimuth θbn of the reference point B.

In step S80, the position of the moving vehicle 1 is calculated in the moving vehicle position operation means 23 on the basis of the temporary differential azimuth βx and the known differential azimuth β.

In step S81, it is judged whether or not the calculated position of the moving vehicle 1 is in the available existence area obtained based on the position which was calculated on the basis of the differential azimuths α and β when the reference point C was detected in the last cycle.

If the moving vehicle 1 is in the available existence area, it is judged that the latest detected azimuth θx is that of the reflector 6c at the reference point C and the reference point B to be detected before that has been missed, and the process goes to step S82 where the missing processing of the reference point B is performed. The missing processing will be described later.

Upon completion of the missing processing of the reference point B, step S83 is entered.

In step S83, judgment is made as to whether or not the missing number of times I LostB for the reference point B has exceeded the threshold value T1. If the missing number of times I LostB has exceeded the threshold value T1, the process goes to step S136 where the clutch 20 is let out, the engine 16 is stopped (step S137), and the fail lamp is made to blink (step S138).

In the decision in the step S83, if the missing number of times I LostB has not exceeded the threshold value T1, the process goes to step S84 to carry out the determination of the azimuth $\theta c$ of the reference point C. In step S85, the value in the pole counter 27 is renewed to a value of "3" which corresponds to the reference point C.

If it is judged in step S81 that the moving vehicle 1 is not lying in the available existence area, it is assumed that the detected azimuth $\theta x$ is that of a reflector 6a at the reference point A.

In step S86, a temporary differential azimuth $\alpha x$ is calculated based on the difference between the detected azimuth $\theta x$ and the known azimuth $\theta bn$ of the reference point B. In step S87, the position of the moving vehicle 1 is calculated on the basis of the temporary differential azimuth $\alpha x$ and the known differential azimuth $\beta$.

In step S88, it is judged whether or not the calculated position of the moving vehicle 1 is in the available existence area obtained based on the position which was calculated on the basis of the differential azimuths $\alpha$ and $\beta$ when the reference point A was detected in the last cycle.

If the calculated position of the moving vehicle 1 is not in the available existence area, it is judged that the received light beam signal is not based on the reflected light from any of the reflectors 6 at the reference points A, B and C, and the process goes to step S139 where a noise warning lamp (not shown) is turned on. In step S140, the position or coordinates of the moving vehicle 1 and the azimuth of the noise source as viewed from the moving vehicle 1 at the same time when the noise was detected are read in, and their values are stored in a storing means 37.

If the detected position of the moving vehicle 1 is in the available existence area, a judgment is made in step S89 as to whether or not the light beam reflector 3 has made one revolution since the last reception of the reflected light. If it is negative, the process goes to step S139, while if it has already finished one revolution, it is judged that the reference points B and C have been consecutively missed and the missing processing of the reference point B is performed in step S90.

Upon the completion of the missing processing of the reference point B, step S91 is entered where a judgment is made as to whether or not the missing number of times I LostB has exceeded the threshold value T1. If the missing number of times of the reference point B has exceeded the threshold value T1, the process goes to step S136 to stop the moving vehicle 1.

If the missing number of times I LostB has not exceeded the threshold value T1 in the decision in the above step S91, the process goes to step S92 to perform the missing processing of the reference point C.

In step S93, it is judged whether or not the missing number of times I LostC for the reference point C has exceeded the threshold value T1. If the missing number of times I LostC has exceeded the threshold value T1, the process goes to step S136 to stop the moving vehicle 1.

In the decision in the above step S93, if the missing number of times I LostC has not exceeded the threshold value T1, the process goes to step S94 where "1" is added to the count value I LostBC of the plural missing number counter 31 which represents the number of times the reference points B and C have been consecutively missed.

In step S95, judgment is made as to whether or not the missing number of times I LostBC has exceeded the threshold value T2. If the missing number of times I LostBC has exceeded the threshold value T2, the process goes to step S136 where the clutch 20 is let out, and the engine 19 is stopped (step S137).

In the decision in the step S95, if the missing number of times I LostBC has not exceeded the threshold value T2, the process goes to step S96 to carry out the determination of the azimuth $\theta a$ of the reference point A. In step S97, the value in the pole counter 27 is renewed to a value of "1" which corresponds to the reference point A.

In the above step S71, if it is judged that the moving vehicle 1 is not lying in the available existence area, the process goes to step S98, and if it is judged in step S76 that the moving vehicle 1 is not lying in the available existence area, the process goes to step S117. The processings of steps S99–S116 subsequent to step S98 and steps S118–S135 subsequent to step S117 are similar to the processing of steps S80–S97 which have been described above, so the description thereof is omitted.

Now, the determination process of the azimuths $\theta a$–$\theta c$ of the reference points as viewed from the moving vehicle 1 and the reference point missing processing operation in the reference point missing processing means 28 are described with reference to the flowcharts of FIGS. 5 and 6.

Figure 5C:
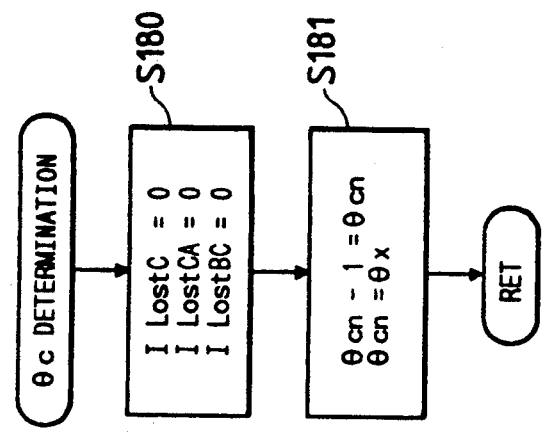
FIGS. 5A-5C is a flowchart showing a processing for determining azimuth.
Figure 5B:
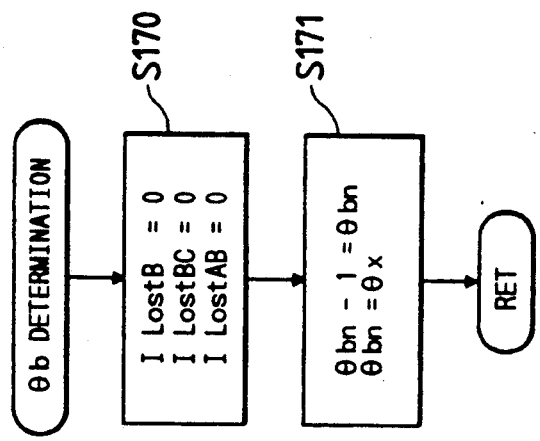
Figure 5A:
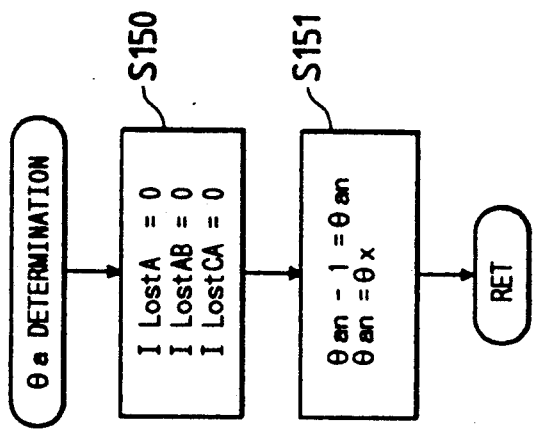

FIG. 5A is a flowchart showing in detail the step S77 (FIG. 4) for determination of the azimuth $\theta a$ of the reference point A.

In step S150, "0" is set as the missing number of times of the reference point A, I LostA, in the missing number of times counter 30, and at the same time, "0's" are set as the numbers of times I Lost AB and I LostCA in the plural missing number of times counter 31, respectively. In step S151, the azimuths $\theta an$ detected in the last detection cycle and $\theta x$ detected in the current detection cycle are read in as $\theta an-1$ and $\theta an$, respectively, to renew the data.

Processings for determining the azimuth $\theta b$ and $\theta c$ of the reference points B and C are shown in FIGS. 5B and 5C, respectively. They are the same as that for the azimuth $\theta a$ of the reference point A, and accordingly it can be easily understood from the above description so that the explanation therefor is omitted.

Figure 6C:
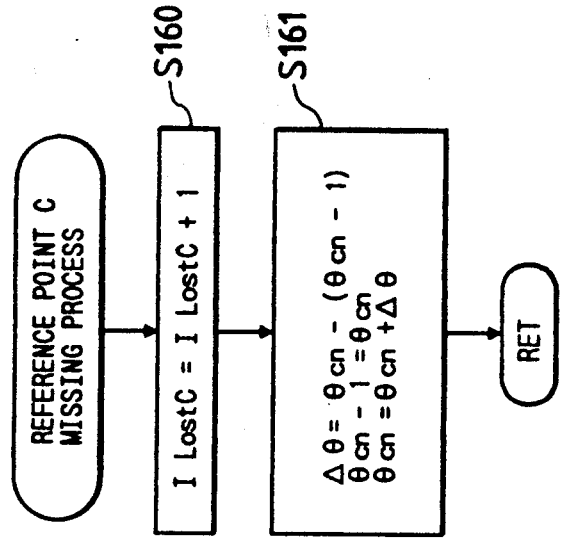
FIGS. 6A-6C is a flowchart showing a processing for reference points lost.
Figure 6B:
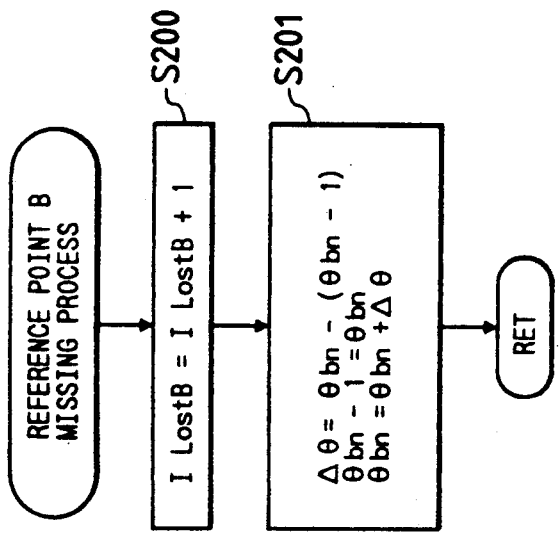
Figure 6A:
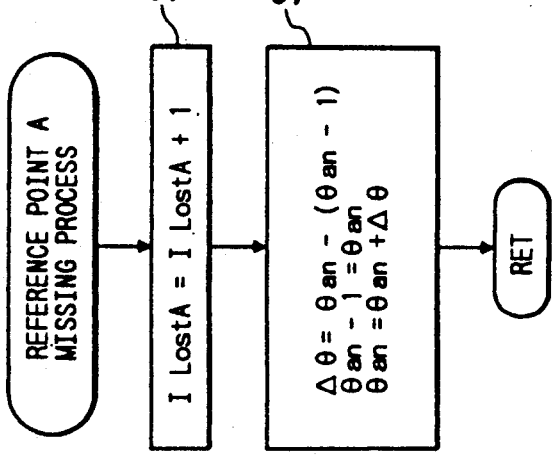

FIG. 6A is a flowchart showing in detail the step S109 (FIG. 4) of the missing processing for the reference point A.

In step S190, "1" is added to the missing number of times of the reference point A, I LostA. In step S191, a difference $\{\theta an-(\theta an-1)\}$ between a pair of the azimuths of the reference point A which have been detected in the last detection cycle and the current detection cycle are read in as $\Delta\theta$, so that azimuths $\theta an-1$ detected in the last detection cycle and θan detected in the current detection cycle are renewed by the θan and (θan+Δθ), respectively. The difference Δθ between the aforesaid two azimuths is not limited to a result obtained by calculating {θan−(θan−1)}, but a fixed value which has been set previously based on a value found by an experiment may be used as Δθ.

When a particular reference point can not be detected within an expected range, the azimuth data of the particular reference point are presumed and renewed by the missing processing as described above on the basis of the azimuth data in the last and the current detection cycles, and then the current position and the advance direction of the moving vehicle 1 are calculated on the basis of the renewed data.

Missing processings for other reference points B and C are also similarly effected as for the reference point A as seen in FIGS. 6B and 6C.

Although, in this embodiment, the range in which the moving vehicle is predicted to exist when a particular reference point is detected in the current scanning cycle is set in the range of fixed values ±Δx and ±Δy, centering around the position of the moving vehicle 1 of the same particular reference point at the last detection time, the available existence area may be determined as follows.

Figure 9:
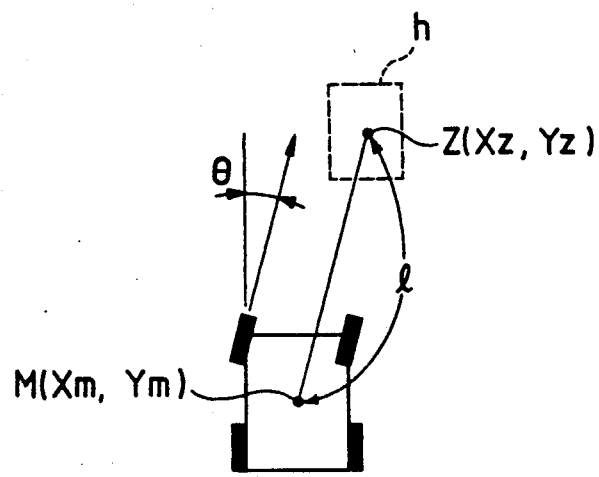
FIG. 9 is an illustration for explaining another method for determining the available existence area of the moving vehicle.

FIG. 9 is an illustration for explaining another method for determining the available existence area of the moving vehicle 1. In the same figure, the coordinates of the predictive position Z can be calculated by the following equations (1) on the assumption that the current position of the moving vehicle 1 at the time of predicting the available existence area is M(Xm, Ym), the predicted position is Z(Xz, Yz), the steering angle of the moving vehicle 1 is θ, and the travel distance from the position M to Z is l.

$$Xz = Xm + l\sin\theta \\ Yz = Ym + l\cos\theta \quad (1)$$

Here, the distance the moving vehicle 1 travels during one revolution of the light beam receiver 3 is l, and the distance l can previously be determined if the moving vehicle 1 travels at a fixed speed, otherwise the travel distance for one revolution of the light beam receiver 3 immediately before the prediction can be detected and determined based on the number of revolution of the wheels.

And, if the position T(x, y) of the moving vehicle 1 calculated when the light beam signal is received in the current cycle is in the area h expressed by the following equations (2), it is judged that the normal light from the expected reflector 6 has been received.

$$(Xz - \delta x) < x < (Xz + \delta x) \\ (Yz - \delta y) < y < (Yz + \delta y) \quad (2)$$

The allowable ranges Γx and δy in respect of the predictive position Z can be set to fixed values which are previously established by experiment, or a value corresponding to the distance l calculated from the number of revolution of the wheels.

As described above, in this embodiment, a judgment is made as to whether or not the light detected in the light beam receiver 3 is the light reflected from the reflector disposed at an expected reference point, and if it is the normal reflected light from the expected reflector 6, the position and advance direction for the steering control of the moving vehicle 1 are calculated on the basis of the received light. Since the judgment on the normal reflected light is made according to the judgment as to whether or not the position of the moving vehicle 1 calculated for each reflected light reception is in the predicted position, the missing of the reference point and noise from an object other than the reference point can easily be discriminated.

In this embodiment, the available existence area of the moving vehicle 1 is set on the range in which the moving vehicle 1 will lie when the same reference point is detected in the next scanning cycle. However, this invention is not limited to this, but it may be allowed to establish as the available existence area, the range in which the moving vehicle 1 is predicted to exist when the adjacent next reference point expected to be successively detected will be detected. In this case, upon each detection of a received light beam signal, it is only needed to judge whether or not the detected reference point is the normal expected reference point according to whether or not the moving vehicle 1 is lying in the available existence area.

Although, in this embodiment, the missing processing is performed or the moving vehicle is stopped if the reference point or points have been missed by a predetermined number of times, it may also be allowed to perform the missing precessing or stop the moving vehicle is the reference points have been continually missed during a predetermined time, or while the moving vehicle continually travels a predetermined distance.

In this embodiment, if the reference point is missed, the azimuth of the reference point is estimated and the position and advance direction of the moving vehicle are calculated on the basis of the estimated value, but, it may be allowed that only the azimuth is estimated, the calculation of the position and advance direction is cancelled, and the traveling of the vehicle continues with the advance direction same as before.

Although, in this embodiment, the moving vehicle is guided by radio control to the start-to-work position, it may be also allowed that, while the moving vehicle stays at the return position, light is scanned to detect the azimuths of the reference points, the traveling course from the return position to the start-to-work position is operated on the basis of the azimuths, and the moving vehicle is made to travel along the operated course to the start-to-work position. In this case, the reference point discriminating process is preferably preformed while the vehicle travels to the start-to-work position.

In this embodiment, the description was illustratively made for the case where the reference points are placed at three spots, but it will easily be understood that the present invention can be implemented by means similar to this embodiment even when the reference points are at four or more spots.

As apparent from the above description, in accordance with the present invention, the following effects can be accomplished.

Since the available existence area for the moving vehicle can be set to a narrow range in which the moving vehicle is expected to travel during one revolution of the light beam receiving means, erroneous recognition of other reflecting object or light-emitting object lying in front of or behind the reference point in the scanning direction as the expected reflecting means will be reduced. As a result, the time and/or labour for removing unnecessary and harmful reflecting objects or light-emitting objects in and around the working area prior to the working can be reduced.

Since the traveling of the moving vehicle can be continued even if the reference point is temporarily missed, the work can be performed even in a working area under such a poor condition that the moving vehicle somewhat rolls, so that the application range of the moving vehicle can be expanded.

Even if the missing number of times of the reference point increases, the accumulation of errors in the estimation is small.

What is claimed is:

1. A system for detecting reference points to calculate a position of a moving vehicle wherein the position of the moving vehicle is detected by scanning the light beam generated from the moving vehicle in the circular direction centering around itself and receiving the light reflected by light-reflecting means disposed at at least three reference points, the system comprising:
   a means for detecting an azimuth of each said light-reflecting means in respect of the moving vehicle on the basis of a receiving interval of the reflected light from the light-reflecting means,
   a means for calculating the current position of the moving vehicle on the basis of the azimuths detected in the azimuth detecting means,
   a means for calculating the available existence area in which the moving vehicle is predicted to exist at the next azimuth detection time, on the basis of the current position of the moving vehicle calculated in the current position calculating means,
   a means for comparing the position of the moving vehicle calculated on the basis of the detected azimuth at the next azimuth detection time with the available existence area, and
   a judging means for judging that the detected azimuth is that of the light-reflecting means disposed at an expected reference point if the calculated moving vehicle position is in the available existence area, while the detected azimuth is not that of the light-reflecting means disposed at the expected reference point if the calculated moving vehicle position is not in the available existence area.

2. A system for detecting reference points to calculate a position of a moving vehicle as set forth in claim 1 which includes further means whereby, if the detected azimuth is judged not to be that of the light-reflecting means disposed at the expected reference point by the judging means, the azimuth of the light-reflecting means disposed at the expected reference point is estimated, and then the position of the moving vehicle is calculated on the basis of the estimated azimuth.

3. A system for detecting reference points to calculate a position of a moving vehicle as set forth in claim 1 further including:
   a means whereby, if the detected azimuth is judged not to be that of the light-reflecting means disposed at the expected reference point by the judging means, supposing that the detected azimuth is that of a light-reflecting means disposed at a different reference point to be sequentially detected following the expected light-reflecting means, and a judgment is made as to whether or not the position of the moving vehicle calculated on the basis of the supposed azimuth is in the available existence area of the moving vehicle which was predicted when the respective light-reflecting means were detected in the last cycle, and
   a means for calculating the position of the moving vehicle on the basis of the azimuths of the light-reflecting means which are determined when the moving vehicle is finally judged to be in the available existence area.

4. A system for detecting reference points to calculate a position of a moving vehicle as set forth in claim 1 wherein the azimuth to be detected in the next cycle is that of the light-reflecting means disposed at the next reference point which is adjoining the previously detected reference point and to be detected subsequently to the previously detected azimuth.

5. A system for detecting reference points to calculate a position of a moving vehicle as set forth in claim 1 wherein the available existence area of the moving vehicle is an area of a predetermined distance centering around the position of the moving vehicle at the last time of the azimuth detection.

6. A system for detecting reference points to calculate a position of a moving vehicle as set forth in claim 1 wherein the available existence area of the moving vehicle is a predetermined area centering around the position which was calculated on the basis of the position and wheel steering angle of the moving vehicle at the last time of the azimuth detection, and of the distance expected to be traveled by the moving vehicle during a predetermined period of time.

7. A system for detecting a position of a moving vehicle wherein the position of the moving vehicle is detected by scanning the light beam generated from the moving vehicle in a circular direction centering around itself and receiving the light reflected by light-reflecting means disposed at at least three reference points, the system comprising:
   a means for detecting an azimuth of each said light-reflecting means in respect of the moving vehicle on the basis of a receiving interval of the reflected light from the light-reflecting means,
   a means for calculating the current position of the moving vehicle on the basis of the azimuths detected in the azimuth detecting means,
   a means for calculating the available existence area in which the moving vehicle is predicted to exist at the next azimuth detection time, on the basis of the current position of the moving vehicle calculated in the current position calculating means,
   a means for comparing the position of the moving vehicle calculated on the basis of the detected azimuth at the next azimuth detection time with the available existence area, and
   a judging means for judging that the detected azimuth is that of the light-reflecting means disposed at an expected reference point if the calculated moving vehicle position is in the available existence area, while the detected azimuth is not that of the light-reflecting means disposed at the expected reference point if the calculated moving vehicle position is not in the available existence area, and
   a means for calculating an advance direction of the moving vehicle on the basis of the detected azimuth, if the detected azimuth is judged to be that of the light-reflecting means disposed at the expected reference point by the judging means.

8. A system for detecting a position of a moving vehicle as set forth in claim 7 which includes further means whereby, if the detected azimuth is judged not to be that of the light-reflecting means disposed at the expected reference point by the judging means, the azimuth of the light-reflecting means disposed at the expected reference point is estimated, and then the position of the moving vehicle is calculated on the basis of the estimated azimuth.

9. A system for detecting a position of a moving vehicle as set forth in claim 7 further including:

a means whereby, if the detected azimuth is judged not to be that of the light-reflecting means disposed at the expected reference point by the judging means, supposing that the detected azimuth is that of a light-reflecting means disposed at a different reference point to be sequentially detected following the expected light-reflecting means, and a judgement is made as to whether or not the position of the moving vehicle calculated on the basis of the supposed azimuth is in the available existence area of the moving vehicle which was predicted when the respective light-reflecting means were detected in the last cycle, and a means for calculating the position of the moving vehicle on the basis of the azimuths of the light-reflecting means which are determined when the moving vehicle is finally judged to be in the available existence area.

10. A system for detecting a position of a moving vehicle as set forth in claim 7 wherein the azimuth to be detected in the next cycle is that of the light-reflecting means disposed at the next reference point which is adjoining the previously detected reference point and to be detected subsequently to the previously detected azimuth.

11. A system for detecting a position of a moving vehicle as set forth in claim 7 wherein the available existence area of the moving vehicle is an area of a predetermined distance centering around the position of the moving vehicle at the last time of the azimuth detection.

12. A system for detecting a position of a moving vehicle as set forth in claim 7 wherein the available existence area of the moving vehicle is a predetermined area centering around the position which was calculated on the basis of the position and wheel steering angle of the moving vehicle at the last time of the azimuth detection, and of the distance expected to be traveled by the moving vehicle during a predetermined period of time.

* * * * *